United States Patent
Sigl et al.

[11] Patent Number: 5,372,979
[45] Date of Patent: Dec. 13, 1994

[54] COMPOSITE MATERIALS BASED ON TITANIUM DIBORIDE

[75] Inventors: Lorenz Sigl, Lechaschau, Austria; Karl-Alexander Schwetz, Sulzberg, Germany; Thomas Jungling, Karlsruhe, Germany; Rainer Oberacker, Dettenheim, Germany; Fritz Thuemmler, Karlsruhe, Germany

[73] Assignee: Elektroschmelzwerk Kempten GmbH, Munich, Germany

[21] Appl. No.: 146,976

[22] Filed: Nov. 3, 1993

[30] Foreign Application Priority Data

Nov. 5, 1992 [DE] Germany ............................. 4237423

[51] Int. Cl.⁵ .............................................. C04B 35/58
[52] U.S. Cl. ....................................... 501/96; 51/307
[58] Field of Search ............................ 501/96; 51/307

[56] References Cited

U.S. PATENT DOCUMENTS

| | | | |
|---|---|---|---|
| 4,259,119 | 3/1981 | Watanabe et al. | 501/96 |
| 4,379,852 | 4/1983 | Watanabe et al. | 501/87 |
| 5,045,512 | 9/1991 | Lange et al. | 501/96 |
| 5,102,835 | 4/1992 | Saito et al. | 501/96 |

FOREIGN PATENT DOCUMENTS

| | | |
|---|---|---|
| 0433856 | 6/1991 | European Pat. Off. . |
| 58-20906 | 4/1983 | Japan . |

OTHER PUBLICATIONS

Powder Metall. Int., Bd. 23, No. 5, 1991, pp. 296–300, Th. Jüngling et al. "Pressureless Sintering of TiB₂–Fe–Materials" No month.

R. Telle and G. Petzkow, Mat. Sci. Eng. A105/106, (1988), pp. 97–104 "Strengthening and Toughening of Boride and Carbide Hard Material Composites".

I. Smid and E. Kny "Evaluation of Binder Phases for Hardmetal Systems based on $TiB_2$", Int. J. Refractory and Hard Materials, 9, 1988, pp. 135–138.

R. Kieffer and F. Benesovsky, Hartmetalle, pp. 476–477, 1965, Springer Verlag.

*Primary Examiner*—Karl Group
*Attorney, Agent, or Firm*—Burgess, Ryan and Wayne

[57] ABSTRACT

Composite materials are provided based on titanium diboride and processes for their preparation.

The composite materials contain
(1) 70 to 98% by volume of titanium diboride,
(2) 1 to 15% by volume of $Fe_2B$ and
(3) 1 to 15% by volume of $Ti_2O_3$ and have the following properties:
density at least 93% of the theoretically possible density of the total composite material,
hardness (HV10) greater than 1,900,
bending fracture strength (measured by the three-point method at room temperature) at least 400 MPa and
fracture resistance $K_{IC}$ (measured with a sharp incipient crack produced by the bridge method) of at least 4.5 MPa$\sqrt{m}$.

4 Claims, 1 Drawing Sheet

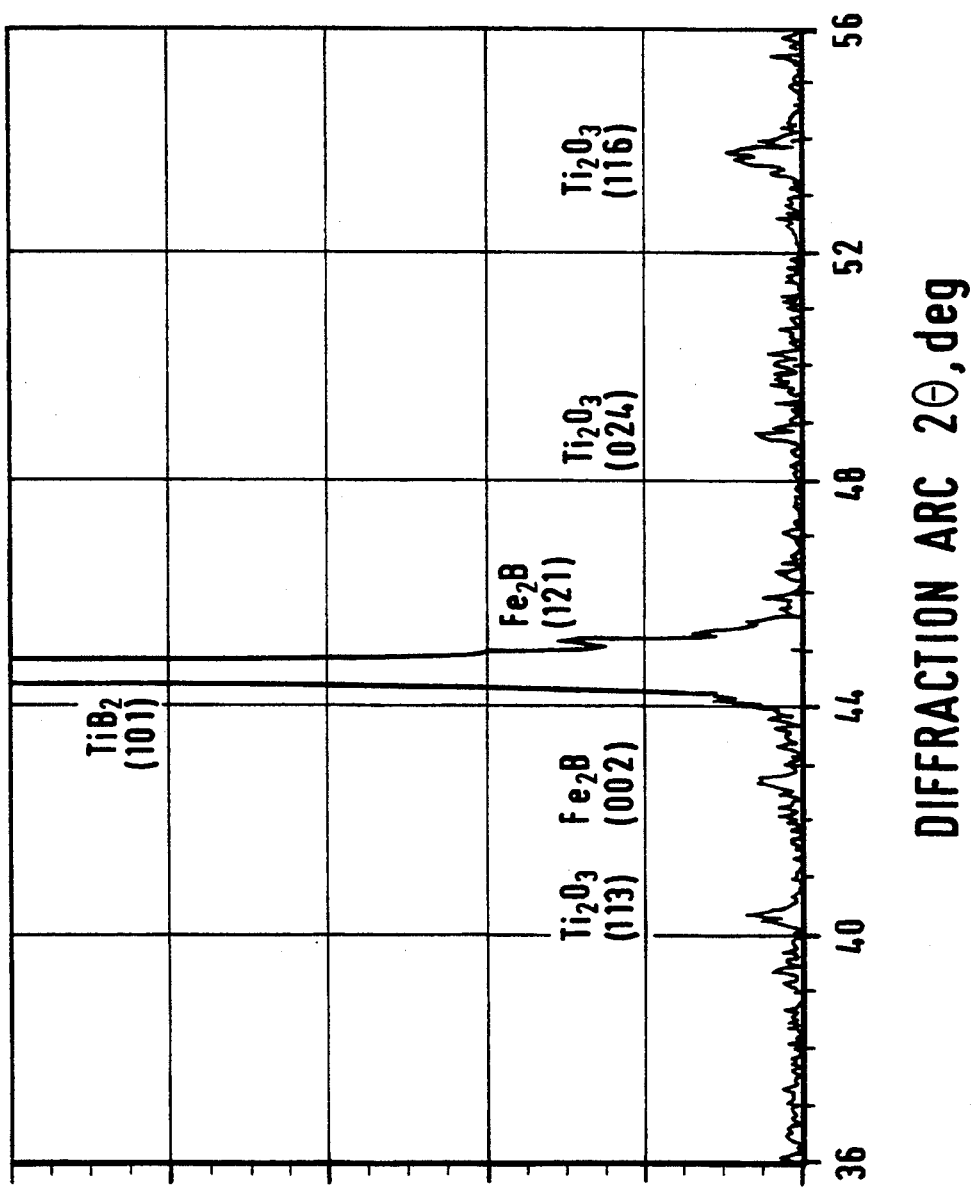

COMPOSITE MATERIALS BASED ON TITANIUM DIBORIDE

BACKGROUND OF THE INVENTION

1) Field of the Invention

The invention relates to composite materials based on titanium diboride and processes for their preparation.

2) Background Art

Materials based on titanium diboride have an extremely high melting point, good chemical stability, great hardness at low and high temperatures, good creep resistance and oxidation resistance, very good electrical conductivity and a low density. Owing to these properties, they are suitable for a large number of industrial uses, for example as cutting tools, as electrode material but also as wearing components or as structural parts in machines subjected to high thermal stress.

The preparation of such composite materials presents problems, since $TiB_2$ can be compacted only to an insufficient extent and only at extremely high temperatures of more than 2100° C. by sintering under atmospheric pressure. It was therefore attempted to decrease the sintering temperature and at the same time to increase the compactability by adding sintering assistants.

U.S. Pat. No. 4,379,852 by Watanabe et al. describes combinations based on diborides, in particular of titanium and of zirconium, of binders based on boride, such as, in particular, Co, Ni or Fe boride, and their preparation. The substances described in the patent are very hard and solid but particularly brittle.

U.S. Pat. No. 4,259,119 by Watanabe et al. describes composite materials consisting of 99.99 to 70% by weight of a combination of two diborides selected from the group comprising the diborides of Ti, Ta, Cr, Mn, Mo, Y, V, Hf, Nb, Al and Zr and 0.01 to 30% by weight of a binder based on boride, which is selected from one or more of the metal borides of Ni, Fe or Co. In the Examples, only NiB, $Ni_4B_3$, FeB and CoB are used as boride-based binders.

In both of the above-mentioned patents, $Fe_2B$ is also mentioned as one of the possible binders for the preparation of the particular composite materials. However, none of the examples describes a material which contains $Fe_2B$ as a sintering assistant.

R. Telle and G. Petzow, Mat. Sci. Eng. A105/106 (1988), pages 97–104, disclose that composite materials which, in addition to titanium diboride, also contain metal-rich borides, such as $Fe_2B$, $Ni_3B$ or $Co_3B$, have low hardness and toughness. For this reason, and also on the basis of the prior art stated below, it has always been attempted in the past to avoid the formation of $Fe_2B$ in the particular composite materials. Thus, for example, R. Kieffer and F. Benesovsky, Hartmetalle S476, Springer Verlag 1965, class such materials as brittle and not very promising for use as cutting and wearing materials. Furthermore, in the publication by I. Smid and E. Kny "Evaluation of Binder Phases for Hard Metal Systems based on $TiB_2$", Int. J. Refractory and Hard Materials 8, 1988, 135–138, a weakening of the binder phase and hence of the material is attributed to the occurrence of $Fe_2B$ (page 137, 1st paragraph, lines 9–11). In the patent application EP-A-0 433 856, which describes hard metal mixed materials based on borides, nitrides and iron binder metals, it is stated repeatedly that the formation of $Fe_2B$ must be avoided (cf. EP-A-0 433 856, page 2, lines 14–19 and lines 41–45; page 3, lines 23–32). In spite of the mention in a list in the above-mentioned U.S. Patents, a person skilled in the art will therefore tend to avoid experiments with $Fe_2B$ as a sintering assistant for materials based on titanium diboride, in view of the further stated publications.

It is therefore an object of the present invention to provide highly dense, very hard, tough and solid composite materials which are based on titanium diboride and can be sintered even at relatively low temperatures under atmospheric pressure.

SUMMARY OF THE INVENTION

The object is achieved by composite materials based on titanium diboride, which contain
(1) 70 to 98% by volume of titanium diboride,
(2) 1 to 15% by volume of $Fe_2B$ and
(3) 1 to 15% by volume of $Ti_2O_3$
and have the following properties:
Density at least 93% of the theoretically possible density of the total composite material,
hardness (HV10) greater than 1,900,
bending fracture strength (measured by the three-point method at room temperature) at least 400 MPa,
fracture resistance $K_{IC}$ (measured with a sharp incipient crack produced by the bridge method) of at least 4.5 MPa$\sqrt{m}$.

Composite materials which consist only of titanium diboride, $Fe_2B$ and $Ti_2O_3$ have proven particularly useful. These composite materials consist of 73 to 96% by volume, preferably about 84 to 96% by volume, particularly preferably about 90% by volume, of titanium diboride and 3 to 12% by volume, preferably about 7% by volume, of $Fe_2B$. These particularly proven composite materials also contain 1 to 15% by volume of $Ti_2O_3$. They have the following properties:
Density at least 95% of the theoretically possible density of the total composite material,
hardness (HV10) greater than 2,000,
bending fracture strength (measured by the three-point method at room temperature) at least 500 MPa and
fracture resistance $K_{IC}$ (measured with a sharp incipient crack produced by the bridge method) of at least 4.5 MPa$\sqrt{m}$.

BRIEF DESCRIPTION OF THE DRAWINGS

FIG. 1 is the X-ray diffractometer analysis of the sintered body according to the instant invention.

DESCRIPTION OF THE PREFERRED EMBODIMENT

In the composite materials according to the present invention, the $Fe_2B$ phase always found to be troublesome to date is used specifically as a sintering assistant. In this context, $Fe_2B$ can be added as a pure substance. However, it is preferable to produce $Fe_2B$ by reaction from elemental iron in the course of sintering. For this purpose, a boron-containing substance, for example $B_4C$, and/or elemental boron and/or carbon are added to the starting powder mixtures.

The composite materials according to the invention can be prepared by liquid-phase sintering under atmospheric pressure, if necessary with subsequent hot-isostatic pressing, or by combined sintering/hot-isostatic pressing.

Commercial titanium diboride powders having a grain size of <10 μm are suitable as starting powders.

Titanium diboride powders having a grain size of <5 μm are preferred. The chemical compositions of some commercial starting powders are shown in Table 1 by way of example.

TABLE 1

| Chemical composition of TiB$_2$ powders in % by weight | | | | | |
|---|---|---|---|---|---|
| Powder designation | Ti | B | O | N | C | Metallic impurities |
| 1 | 66.5 | 29.7 | 2.1 | 0.06 | 0.17 | <0.6 |
| 2 | 66.5 | 28.5 | 1.5 | 0.1 | 0.25 | <0.6 |
| 3 | 67.5 | 29.5 | 0.3 | 0.2 | 0.2 | <0.6 |
| 4 | 67.3 | 29.8 | 0.2 | 0.2 | 0.3 | <0.6 |
| 5 | 66.5 | 28.5 | 1.0 | 1.0 | 1.0 | <0.4 |

The sintering assistant Fe$_2$B can be introduced into the composite material by two methods, the method mentioned second being preferred:

1) by introducing a suitable amount of Fe$_2$B powder into the TiB$_2$ powder. The Fe$_2$B starting powders should have a grain size smaller than 10 μm.
(2) by introducing a suitable amount of pulverulent iron or pulverulent steel into the TiB$_2$ powder. The iron or steel powders should have a grain size smaller than 50 μm, preferably <25 μm.

The pulverulent iron can be added to the TiB$_2$ powder either directly, for example in the form of commercial iron or steel powders, but it can also be introduced into the TiB$_2$ powder in the form of abraded material via the milling of TiB$_2$ with steel or iron balls. Examples of suitable iron and steel powders are shown in Table 2.

TABLE 2

| Chemical composition of commercial iron/steel powders in % by weight | | | | | | | | |
|---|---|---|---|---|---|---|---|---|
| Powder designation | C | Si | Mn | P | S | Cr | Ni | Mo | Fe |
| 1 | <0.05 | 0.32 | 0.35 | <0.045 | <0.045 | — | — | — | Remainder |
| 2 | 0.1 | 0.22 | 0.45 | 0.035 | 0.035 | — | — | — | Remainder |
| 3 | 0.45 | 0.35 | 0.75 | 0.035 | 0.030 | — | — | — | Remainder |
| 4 | 0.14 | 0.20 | 0.90 | 0.035 | 0.035 | 1.2 | — | 0.25 | Remainder |
| 5 | 0.03 | 0.85 | 0.08 | 0.027 | 0.020 | 19.1 | 10.4 | — | Remainder |
| 6 | 0.05 | 0.95 | 0.83 | 0.035 | 0.030 | 13.5 | — | — | Remainder |

When pulverulent iron is used, the Fe$_2$B is formed preferentially in the course of the sintering, via the reactions represented by equations 1 to 3. The necessary assistants, such as elemental B, B$_4$C or C, are, as a rule, at least partly already present as impurities in the TiB$_2$ starting powder. The assistants are otherwise added to the titanium diboride or to the starting mixture of titanium diboride and iron in the stoichiometrically required amounts, preferably in particle sizes smaller than 10 μm. In the course of the sintering, these assistants react with the iron above about 650° C. with formation of Fe$_2$B, as shown by the following equations:

$$B_4C + 8 Fe \rightarrow 4Fe_2B + C \quad (1)$$

$$B + 2 Fe \rightarrow Fe_2B \quad (2)$$

$$C + TiB_2 + 4Fe \rightarrow 2Fe_2B + TiC \quad (3)$$

Depending on the boron balance, either small amounts of unreacted iron remain behind or, in the case of an excess of boron, formation of small amounts of FeB takes place.

When B$_4$C is used as an assistant, the carbon present in the B$_4$C and formed according to equation (1) subsequently reduces any oxygen present, for example bound to the TiB$_2$ starting powders in the form of titanium oxide, for example according to the reaction:

$$2TiO_2 + C \rightarrow Ti_2O_3 + CO \quad (4)$$

so that, in addition to TiB$_2$ and Fe$_2$B, Ti$_2$O$_3$ is also present in the end product. The reaction (4) is important because it removes the TiO$_2$, which is known to inhibit wetting, from the TiB$_2$ surface, which is thus thoroughly wet by the liquid phase in the further course of sintering.

Milling of the starting powders can be carried out using known milling units, such as ball mills, planetary ball mills and attritors, in which the grinding media and mill containers consist of, for example, iron or steel or iron-containing TiB$_2$ composite materials.

In the case of milling with grinding media comprising iron-containing TiB$_2$ composite materials, in particular coarse starting powders can be comminuted to the desired grain fineness, while grinding media comprising iron are suitable for introducing iron and for adequate mixing of the starting powders, since the comminution effect on the titanium diboride is only small in this case.

Temporary assistants, for example known pressing aids and binders, such as, for example, polyvinyl alcohol or stearic acid, may be added to the powder mixtures obtained after milling of the TiB$_2$ or after the mixing/milling of TiB$_2$-Fe batches, and, if necessary, the mixtures are rendered free-flowing by spray-drying. They are then brought to a desired shape by known ceramic shaping processes, such as, for example, dry pressing, injection molding or extrusion, with formation of green compacts having a minimum density of 40% of the theoretical density, preferably greater than 55% of the theoretical density, if necessary with green processing. By a suitable annealing treatment, for example at temperatures of about 300° C. to 700° C., preferably about 600° C., the pressing aids and binders are removed completely again. Thereafter, the green compacts are heated in the absence of oxygen in a vacuum furnace at temperatures in the range between 1400° and 1900° C., preferably between 1500° and 1700° C. and are kept at this temperature for 10 to 600 min., preferably 15 to 120 min., and finally slowly cooled to room temperature.

Subsequently, if desirable for the particular use, the sintered bodies can, expediently before cooling to room temperature, be subjected to hot-isostatic recompaction by application of pressure by means of a gaseous pressure transmission medium, such as, for example, argon, at temperatures between 1200° and 1500° C. under a pressure of 5 to 200 MPa for a period of 5 to 60 min. As a result of this unconfined hot-isostatic recompaction, virtually all pores still present are eliminated so that the finished sintered body has a density greater than 99% of its theoretical density.

They are suitable in particular for use in the production of tools for the cutting of metals, in particular of Al materials, Fe materials and Ni materials, for the production of tools for non-cutting machining and shaping, for example in drawing, deep drawing, extrusion, hot pressing, rolling, cutting and punching, for the production of tools for rock and concrete working and for the production of wearing parts in general mechanical engineering, such as, for example, support rollers, clamping jaws, guide bushes, packing rings, valves and valve components (valve rings, valve balls), bearing bushes, gage blocks, callipers, thread guides and inserts for press dies and extrusion dies.

In the following Examples, the preparation of composite materials according to the invention is described in more detail. The powders used in the Examples had the following compositions:

TABLE 3

Chemical composition of the TiB$_2$ powder used

| Element | % by weight |
|---|---|
| O | 2.1 |
| C | 0.2 |
| N | 0.05 |
| Ti, B | Remainder |

TABLE 4

Phase composition of the TiB$_2$ powder used

| Phase | % by weight |
|---|---|
| B$_4$C | 0.9 |
| C$_{free}$ | 0.02 |
| B$_2$O$_3$ | 2.6 |
| TiO$_2$ | 1.5 |
| TiB$_2$ | Remainder |

TABLE 5

Chemical composition of the iron powder used

| Element | % by weight |
|---|---|
| O | 0.2 |
| C | 0.05 |
| N | — |
| Fe | Remainder |

EXAMPLE 1

900 g of TiB$_2$ powder having a specific surface area of 2.5 m$^2$/g (Table 3) were milled together with 82.5 g of carbonyl iron powder having a mean particle size of 20 μm (Table 4) in 8 dm$^3$ of n-heptane in a steel planetary ball mill containing steel balls for 6 hours at 120 rpm. As a result of the abrasion of the iron, the iron content increased by about 1.5% by weight and the oxygen content of the powder mixture increased slightly to 2.5% by weight. The powder mixture was then dried in a rotary evaporator and pressed in a die press at 20 MPa and subsequently subjected to cold-isostatic recompaction at 400 MPa to give plates measuring 65×45×10 mm$^3$. These green compacts were then heated in a vacuum of 0.1 mbar to 1650° C. in a sintering furnace with graphite heat conductors and were sintered at this temperature for 30 min. The plates were then slowly cooled to room temperature. The phases occurring in the sintered body were identified with the aid of X-ray diffraction analysis using Cu-K$_g$ radiation, and the chemical composition was determined. The phase composition of the sintered body was calculated from the total analysis. The calculated phase composition of the plates is shown in Table 6 and the chemical composition in Table 7. The X-ray diffractometer analysis of the sintered body is shown in FIG. 1. It is evident from this that only the phases TiB$_2$, Fe$_2$B and Ti$_2$O$_3$ are present in the sintered body, further phases, such as Fe or FeB, not being found.

TABLE 6

Calculated phase composition of the sintered body from Example 1

| Phase | % by weight | % by volume |
|---|---|---|
| TiB$_2$ | 83.5 | 87.4 |
| Fe$_2$B | 11.2 | 7.1 |
| Ti$_2$O$_3$ | 5.3 | 5.5 |

TABLE 7

Chemical composition of the sintered body from Example 1

| Element | % by weight |
|---|---|
| Ti | 60.9 |
| B | 27.1 |
| Fe | 10.1 |
| O | 1.78 |
| N | 0.05 |
| C | 0.01 |

EXAMPLE 2

900 g of TiB$_2$ powder having a specific surface area of 2.5 m$^2$/g (Table 3) were milled together with 160 g of carbonyl iron powder having a mean particle size of 20 μm (Table 4) and 10 g of elemental boron in 8 dm$^3$ of n-heptane in a steel planetary ball mill for 6 hours at 120 rpm. The powders were then dried, pressed and subsequently sintered, as described in Example 1.

EXAMPLE 3

900 g of TiB$_2$ powder having a specific surface area of 2.5 m$^2$/g (Table 3) were milled in a steel attritor using steel balls under n-heptane as milling fluid until 48.5 g of abraded iron (5.1% by weight of Fe) had been used. The powder was then dried, pressed and subsequently sintered, as described in Example 1.

EXAMPLE 4

Sintered plates from Example 1 are subjected to recompaction by hot-isostatic pressing under 10 MPa of Ar at 1500° C. for 30 min. and then cooled.

Test specimens for the determination of various characteristic properties were produced from the sintered and recompacted plates.

The density of the test specimens was measured by the buoyancy method. The strength was determined on bending rods having the dimensions 5×5×35 mm$^3$ in the three-point bending test. The fracture resistance was determined by introducing a sharp incipient crack by the bridge method and a subsequent bending test. The hardness was determined according to Vickers with an indentation load of 98.1N.

The characteristic properties of the materials produced in Examples 1 to 4 are summarized in Table 8.

TABLE 8

Mechanical properties of the sintered bodies of Examples 1 to 4

| Properties | Example 1 | Example 2 | Example 3 | Example 4 |
|---|---|---|---|---|
| Density (g/cm$^3$) | 4.62 | 4.76 | 4.50 | 4.70 |
| Bending strength (MPa) | 606 | 741 | 588 | 750 |
| Hardness (HV 10) | 2260 | 2140 | 2420 | 2350 |
| Toughness | 5.4 | 5.9 | 5.2 | 5.4 |

TABLE 8-continued

| Mechanical properties of the sintered bodies of Examples 1 to 4 | | | | |
|---|---|---|---|---|
| Properties | Example 1 | Example 2 | Example 3 | Example 4 |
| (MPa$\sqrt{m}$) | | | | |
| Modulus of elasticity (GPa) | 510 | 505 | 520 | 515 |

We claim:

1. A composite material based on titanium diboride, which material consists essentially of
   (1) 70 to 98% by volume of titanium diboride,
   (2) 1 to 15% by volume of Fe$_2$B and
   (3) 1 to 15% by volume of Ti$_2$O$_3$
   and has the following properties:
   density at least 93% of the theoretically possible density of the total composite material,
   hardness (HV10) greater than 1,900,
   bending fracture strength (measured by the three-point method at room temperature) at least 400 MPa and fracture resistance K$_{IC}$ (measured with a sharp incipient crack produced by the bridge method) of at least 4.5 MPa$\sqrt{m}$.

2. A composite material as claimed in claim 1, which consists essentially of
   73 to 96% by volume of titanium diboride,
   3 to 12% by volume of Fe$_2$B and
   1 to 15% by volume of Ti$_2$O$_3$
   and has the following properties:
   density at least 95% of the theoretically possible density of the total composite material,
   hardness (EV10) greater than 2,000,
   bending fracture strength (measured by the three-point method at room temperature) at least 500 MPa and
   fracture resistance K$_{IC}$ (measured with a sharp incipient crack produced by the bridge method) of at least 4.5 MPa$\sqrt{m}$.

3. The composite material as claimed in claims 1 or 2, wherein the material is in the shape of a cutting tool.

4. The composite material as claimed in claims 1 or 2, wherein the material is in the shape of a wearing part.

* * * * *